(12) United States Patent
Pacorich et al.

(10) Patent No.: US 7,448,545 B2
(45) Date of Patent: Nov. 11, 2008

(54) METHOD FOR MONITORING ITEMS PASSING THROUGH AN ENTRY/EXIT OPENING IN A DELIMITED SPACE AND APPARATUS TO CARRY OUT SUCH METHOD

(75) Inventors: Massimo Pacorich, Pordenone (IT); Daniele Mari, Trieste (IT); Ennio Pippia, Udine (IT)

(73) Assignee: Electrolux Professional SpA, Pordenone (IT)

( * ) Notice: Subject to any disclaimer, the term of this patent is extended or adjusted under 35 U.S.C. 154(b) by 236 days.

(21) Appl. No.: 11/426,383

(22) Filed: Jun. 26, 2006

(65) Prior Publication Data
US 2007/0007338 A1    Jan. 11, 2007

(30) Foreign Application Priority Data
Jul. 7, 2005     (IT) .......................... PN2005A0044

(51) Int. Cl.
*G06F 19/00* (2006.01)
(52) U.S. Cl. ...................................... 235/385; 235/382
(58) Field of Classification Search ................. 235/385, 235/382, 382.5, 493, 492, 484; 340/568
See application file for complete search history.

(56) References Cited
U.S. PATENT DOCUMENTS

| | | | | |
|---|---|---|---|---|
| 4,791,411 A | * | 12/1988 | Staar | 340/568.1 |
| 6,677,857 B2 | * | 1/2004 | Bara et al. | 340/572.1 |
| 7,293,705 B2 | * | 11/2007 | Linton et al. | 235/385 |

FOREIGN PATENT DOCUMENTS

| | | |
|---|---|---|
| EP | 1 200 931 A1 | 5/2002 |
| JP | 2003-146413 | 5/2003 |
| WO | WO 82/00377 | 2/1982 |

* cited by examiner

*Primary Examiner*—Thien M Le
(74) *Attorney, Agent, or Firm*—Pearne & Gordon LLP

(57) ABSTRACT

Apparatus for monitoring items passing through an entry/exit opening in a delimited space, comprising:
  radio-frequency transmission means (2) adapted to communicate with a plurality of transponders associated with said items to detect the presence of the transponders in proximity of the opening, each transponder being adapted to transmit a specific identifier code,
  at least a pair of optoelectronic sensors (3, 4) arranged in series at said opening, each sensor (3, 4) being adapted to transmit a first signal identifying a condition of clear sensor, in which said sensor (3, 4) detects the opening as being clear, and a second signal identifying a condition of locked-on, i.e. engaged sensor, in which said sensor (3, 4) detects an item passing through said opening.

Control means (5) are provided to continuously store and/or update the time-based detection events of the transponders and the time-based variation events of the signal transmitted by the sensors (3, 4), said control means (5) being adapted to compare said time-based signal-variation events to determine an opening passing-through time interval (T), and to compare the time-based detection events of the transponders with the passing-through time interval (T) to determine the transponders that have passed through the opening.

20 Claims, 4 Drawing Sheets

METHOD FOR MONITORING ITEMS PASSING THROUGH AN ENTRY/EXIT OPENING IN A DELIMITED SPACE AND APPARATUS TO CARRY OUT SUCH METHOD

The present invention refers to a method for monitoring items passing through an entry/exit or inlet/outlet opening in a delimited, i.e. enclosed space, and an apparatus to carry out such method.

Largely known in the art is by now the use of radio-frequency transmission means to detect transponders associated to items or persons, whose presence is desirably to be monitored. The transponders, commonly known as tags in the art, are adapted to receive electromagnetic signals generated by a so-called RFID (Radio-Frequency Identifier) device. The tags, as energized by the electromagnetic field, send a signal containing an identification code, which is unique to each such tag, to said RFID device, which is then able to detect the presence of that particular tag, along with the item or person which said tag is associated to.

Such arrangements are used to check for authorized persons to pass through entry/exit openings of delimited spaces to be controlled for security reasons. An application of this kind is known for instance from Further applications related to monitoring items as they pass through an entry/exit opening of a warehouse, such as disclosed for instance in JP 2003146413, or detecting the presence of persons and items in a delimited space with an entrance, as disclosed in EP 1 200 931.

A drawback that is commonly shared by all these arrangements relates to the capability of handling a plurality of tags passing through an entry/exit opening, such as for example a plurality of items entering and exiting a warehouse. Such drawback derives from the fact that the detection field of the RFID devices extends even far beyond the opening itself to also cover an area that partially involves both the interior and the exterior of the warehouse, so that the possibility exists for transponders that did not enter or exit the warehouse, actually, to be unduly detected.

In addition, with these prior-art arrangements as described above it proves quite complicated a task to try to have the detection events of the tags properly associated to the direction in which the items or persons pass through the opening. Recording whether tags are entering or exiting the delimited space, actually, cannot be performed or occur in any acceptably effective manner, so that it becomes practically impossible for the items that are really present in the warehouse, or—for the matter—the persons present in a site, to be kept precisely track of.

Another drawback encountered with arrangements of the above-cited kind lies in the fact that they do not practically make it possible to discriminate an item or person passing completely through an opening allowing such item or person to enter or exit a delimited space, from such item or person just partially occupying said opening, without passing completely therethrough, so that there may occur that items or persons are detected as being entered or having left a site, whereas they did not do so, actually.

It is therefore a purpose of the present invention to provide a method for monitoring items passing through an entry/exit opening in a delimited space, along with an apparatus for carrying out such method, which overcomes all of the aforecited drawbacks and problems of prior-art arrangements.

It is a further purpose of the present invention to provide an apparatus for carrying out the inventive method, which is extremely reliable, simple in construction and capable of being manufactured at fully competitive costs.

According to the present invention, these aims, along with further ones that will become apparent from the following disclosure, are reached in an apparatus incorporating the features being recited in the appended claims 1 to 12, and a method incorporating the features being recited in the appended claims 13 to 20.

Features and advantages of the present invention will anyway be more readily understood from the description of a preferred, although not sole embodiment thereof, which is given below way of non-limiting example with reference to the accompanying drawings, in which.

Figure 1:
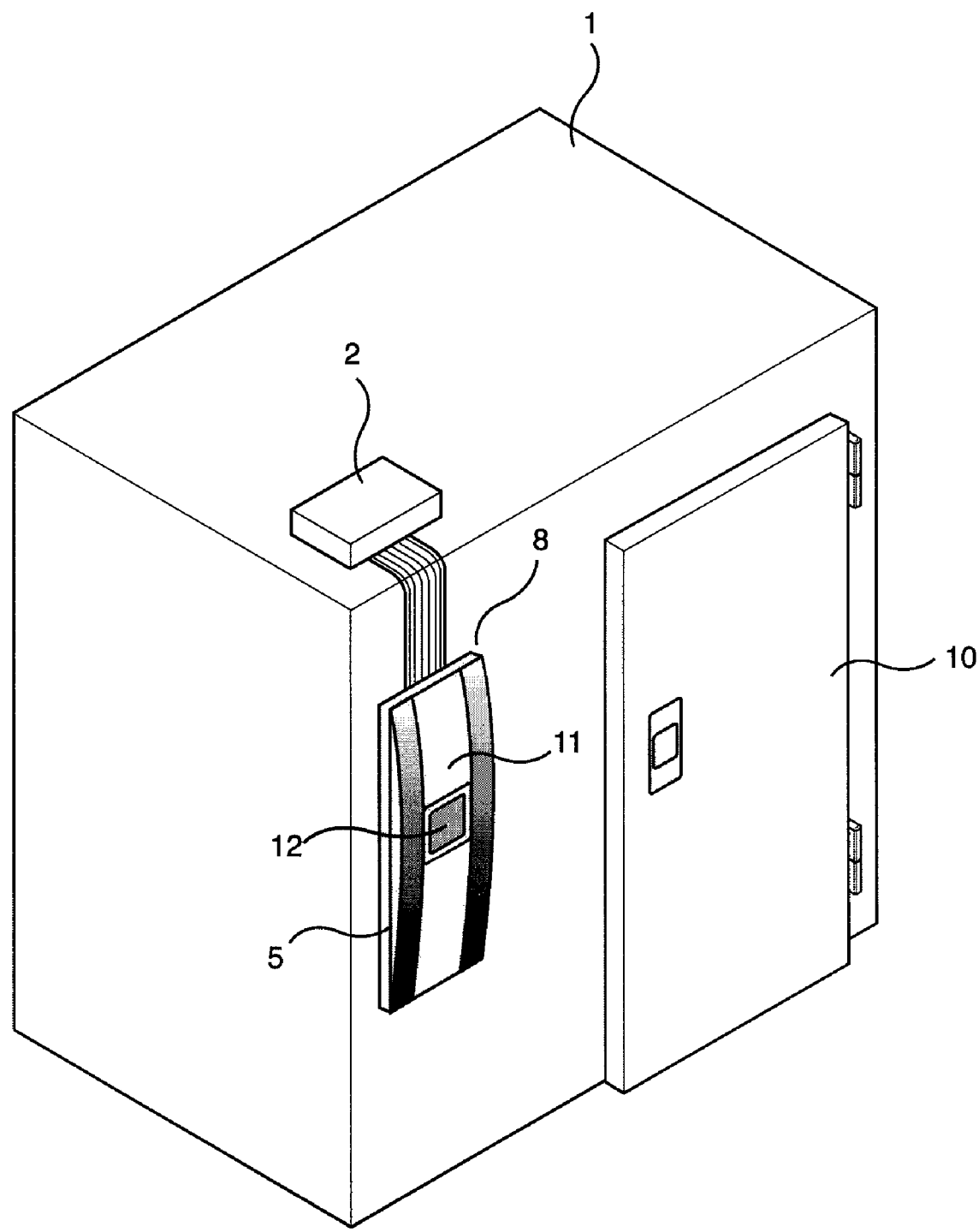
FIG. 1 is a perspective top view of a cold storage room incorporating an apparatus according to the present invention.

With reference to the above-noted Figures, the apparatus for monitoring items passing through an entry/exit opening of a delimited space according to the present invention comprises:

radio-frequency transmission means 2 adapted to communicate with a plurality of transponders associated to said items in view of detecting the presence of the transponders in the proximity of the opening, each such transponder being adapted to transmit a specific identification code, at least a pair of optoelectronic sensors 3, 4 arranged in series in correspondence to the opening, each such sensor 3, 4 being adapted to send out a first signal identifying a clear-sensor condition, in which the sensor 3, 4 is detecting the opening as being clear, and a second signal identifying a condition of locked-on, i.e. engaged sensor, in which the sensor 3, 4 detects an item passing through said opening.

Control means 5 are provided to continuously store and update the time-based detection events of the transponders and the time-based variation events of the signal transmitted by the sensors 3, 4, in which said control means 5 are adapted to compare said time-based signal-variation events to determine an opening passing-through time interval (T), and to compare the time-based detection events of the transponders with the passing-though time interval (T) to determine the transponders that have passed through the opening.

According to a preferred embodiment of the present invention, the apparatus performs a real-time monitoring of the food products that pass through the entry and/or exit opening of a cold storage room 1. The apparatus enables product entries in and exits from said cold storage room to be managed in such a manner as to be able to at any moment determine the current state of the products being available, i.e. actually present inside the cold storage room 1.

Figure 2:
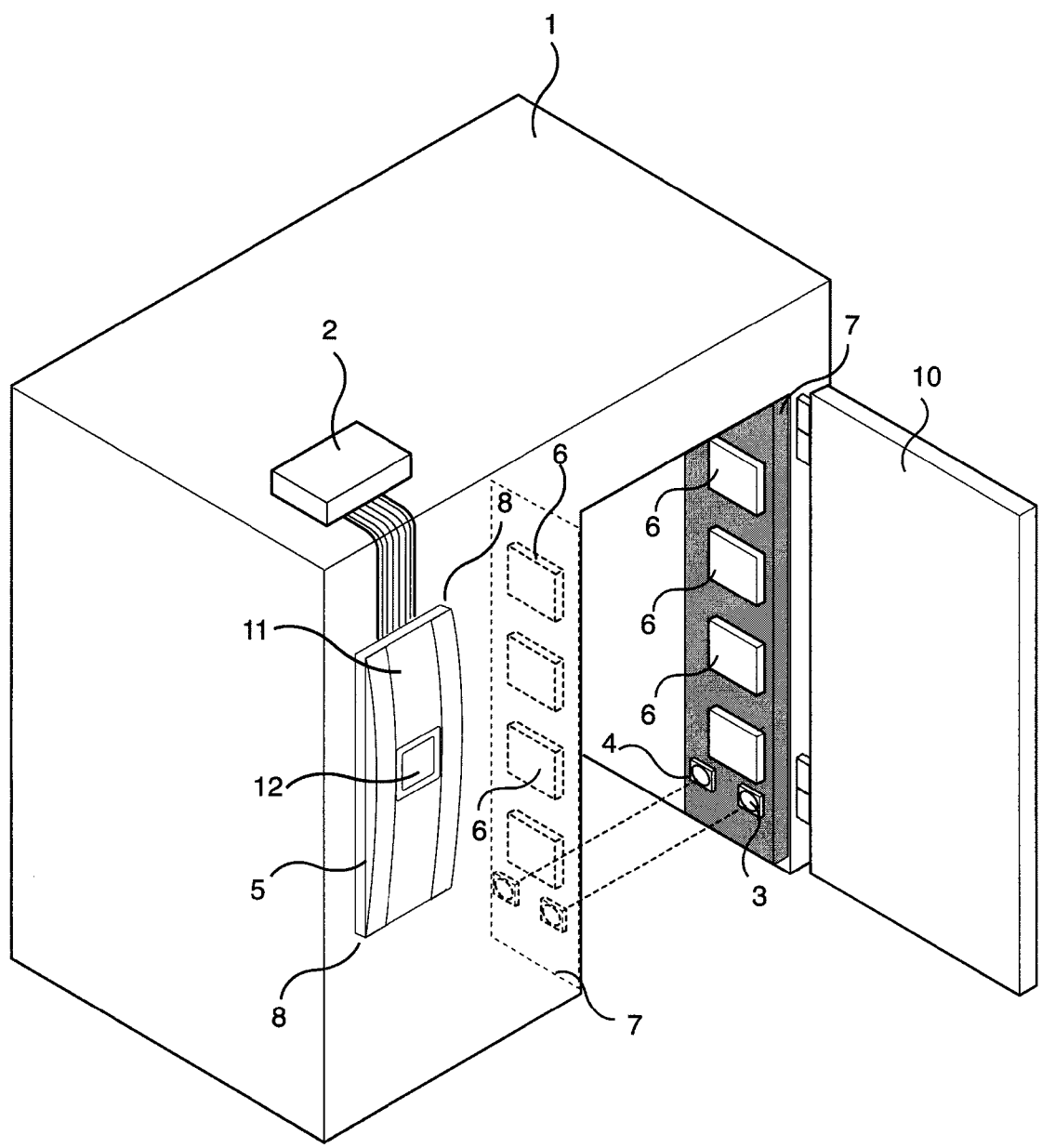
FIG. 2 is a similar view as the one appearing in FIG. 1, showing the optoelectronic sensors and the internal antennas positioned at the entry/exit opening.
Figure 3:
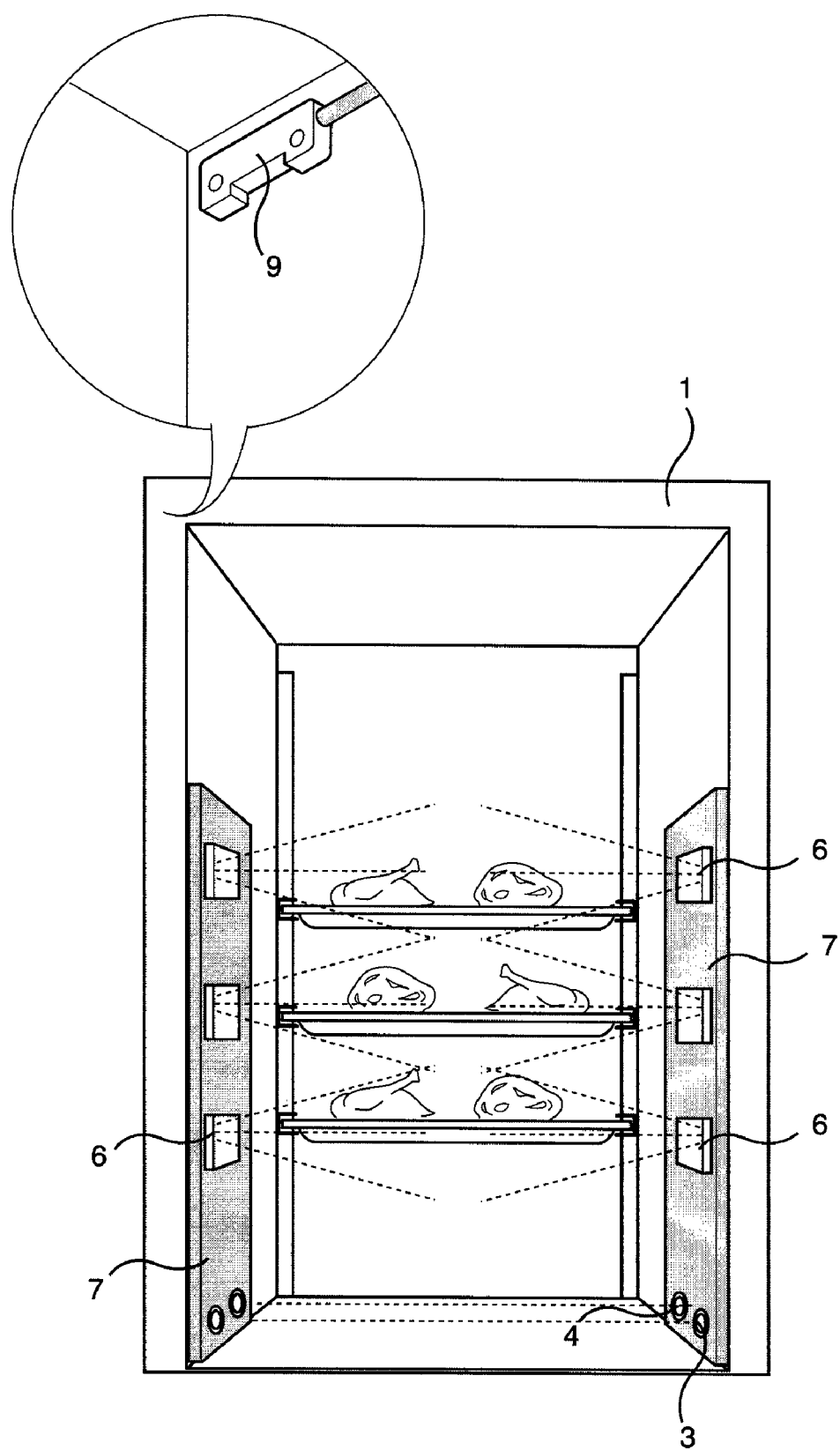
FIG. 3 is a front elevational view of the entry/exit opening of the cold storage room.
Figure 5:
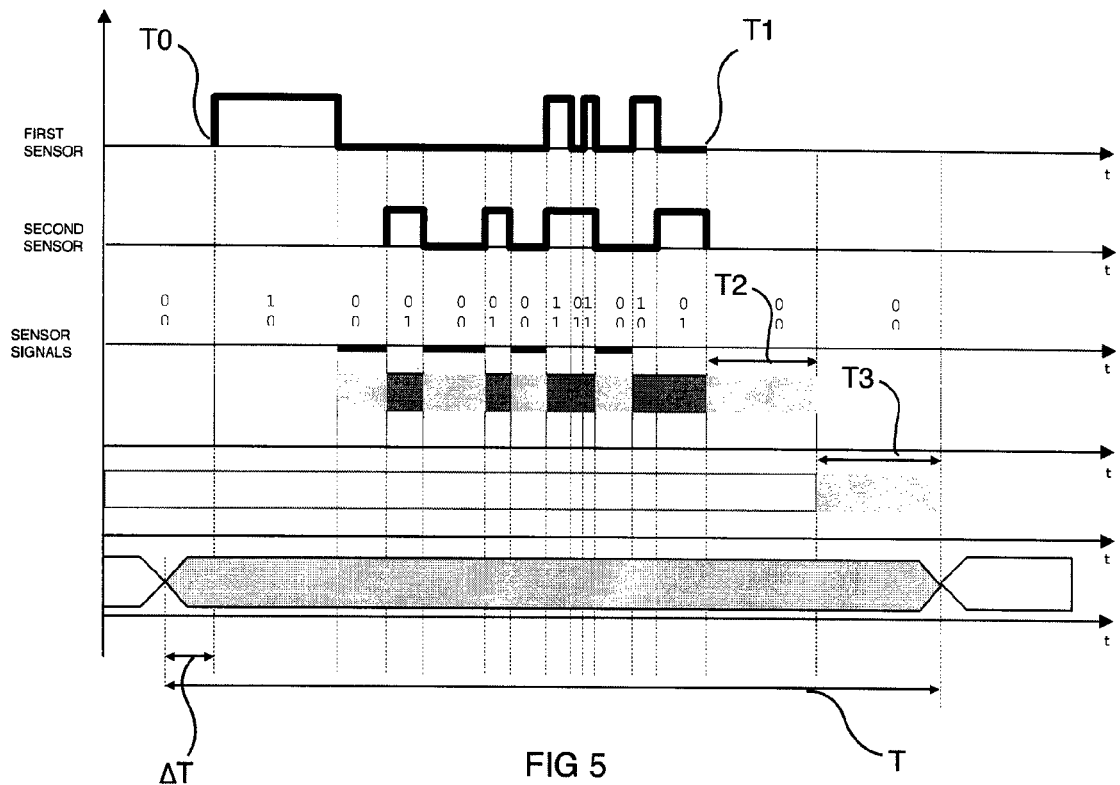
FIG. 5 is a diagrammatical view illustrating a method according to the present invention.

The radio-frequency transmission means 2 comprise a RFID (Radio-Frequency Identification) device adapted to send out and receive electromagnetic signals via a plurality of internal antennas 6 arranged inside the cold storage room 1. Proper support members 7 are provided to accommodate the internal antennas 6 of the RFID device for them to be able to detect the transponders passing through the entry/exit opening. These support members 7 are positioned inside the cold storage room 1 in proximity of the entry/exit opening thereof. In particular, as this is best shown in FIG. 2, the support members 7 are situated close or in correspondence to the jambs that delimitate the entry/exit opening of the cold storage room 1 at the sides thereof. By continuously scanning the internal antennas 6 in an alternate sequence, the RFID device sends electromagnetic signals to possible transponders that are going to pass through the entry/exit opening of the cold storage room 1. The transponders, which are energized by these electromagnetic signals, continuously transmit to the RFID device a radio-frequency identification code that uniquely identifies each single transponder. Transponders of this kind are generally known as radio-frequency tags in the art.

The tags are applied to the food product packages intended for storing in the cold storage room 1, in such manner that a unique identification code corresponds to each product.

Through a programming station 8, as this will be described in greater detail further on, it is possible for a whole set of information to be associated to each tag so as to more precisely characterize the food product, which the tag is going to be applied to. This information may for instance include the species or category, the type, the expiry date of the food product.

The afore-cited support members 7 further accommodate a first optoelectronic sensor 3 and a second optoelectronic sensor 4 located in a series arrangement in correspondence to the lower zone of the entry/exit opening of the cold storage room 1. In the embodiment being discussed, the first optoelectronic sensor 3 comprises a first photocell with the related reflex reflector and the second optoelectronic sensor 4 comprises a second photocell with the related reflex reflector. It will however be appreciated that other types of optoelectronic sensors can be used as well, such as for instance pyroelectric sensors, semiconductor sensors, photoresistors, photodiodes, phototransistors, and the like.

The control means 5 are connected to the radio-frequency transmission means 2 so as to continuously acquire the data issuing from the tags, and are furthermore connected to the optoelectronic sensors 3, 4 so as to continuously acquire the data relating to the state of the entry/exit opening. The control means 5 process such data so as to determine the passing-through, i.e. entry and exit events through the opening of the cold storage room 1, and store and update the resulting data in a database so as to provide information on the food products that are available, i.e. present inside the cold storage room.

According to the present invention, the apparatus comprises a position sensor 9, connected to the control means 5, which monitors the state of the door 10 of the cold storage room 1. The control means 5 actuate the RFID device, and thus the detection scanning operation by means of the internal antennas 6, whenever they receive from the position sensor 9 a signal that is indicative of the open state of the door 10. Advantageously, the sensor may be constituted by a microswitch.

Figure 4:
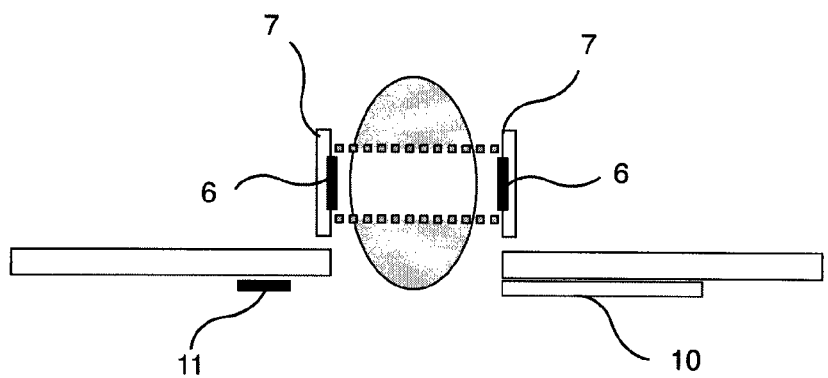
FIG. 4 is a schematical top view of the entry/exit opening of the cold storage room.

The RFID device and the tags are able to communicate within a restricted detection area extending about the entry/exit opening of the cold storage room, as shown schematically in FIG. 4.

When food products are then introduced in or taken out of the cold storage room 1, e.g. by means of a truck or similar handling vehicle, the tags associated to the products being carried across the detection area are continuously detected by the RFID device all along the path followed by them as they pass through the entry/exit opening. The identification code of each tag being so detected is then continuously transmitted to the control means 5 as it moves along and through the opening.

The control means 5 are adapted to store the identification code of the so detected tag, and to store and update in a temporary buffer memory, during the opening passing-through event, the whole sequence of the time-based events in which the tag detection is performed, optionally along with information identifying the antenna that has made such detection.

The control means 5 are adapted to continuously update, in said buffer memory, the time-based tag detection events as long as the open state of the door 10 of the cold storage room 1 persists.

In the case that the tag identification code is already residing in the memory, owing to the tag being inside the cold storage room, to be stored and updated are the time-based detection events.

The control means 5 continuously monitor the optoelectronic sensors 3, 4 that are adapted to indicate items moving through the entry/exit opening of the cold storage room 1 in the area covered by them. These optoelectronic sensors 3, 4 are adapted to transmit a first signal identifying a clear-sensor condition, in which the sensor 3, 4 is detecting a clear state of the entry/exit opening, and a second signal identifying a condition of locked-on, i.e. engaged sensor, in which the sensor 3, 4 detects an item passing through said opening. The control means 5 are adapted to continuously monitor the signals issuing from the optoelectronic sensors 3, 4 and process them to determine both an opening passing-through event and the direction in which such event is taking place.

In the embodiment being described, the first and second photocells are adapted to detect the entry/exit opening being passed through, e.g. by a user who transports food products by means of a truck or similar conveyance vehicle.

The photocells are adapted to send to the control means 5 a "0"-state signal when they are clear, and a "1"-state signal when they are engaged, i.e. locked on. Each variation in the state of the photocells is detected and recorded by the control means 5, which then store and/or update the time-based event in which the variation has occurred. Starting from a detection of an initial resting state "0-0", which therefore indicates a condition of clear entry/exit opening, the control means 5 are adapted to record and store an initial variation in the state of the photocells and the time-based event T0 in which this variation is occurring. For example, there may be detected an initial variation "1-0" on the first and the second photocell, respectively, which may be indicative of an initial phase of an opening passing-through event to enter the cold storage room, or an initial variation "0-1" on the first and the second photocell, respectively, which may be indicative of an initial phase of an opening passing-through event to exit the cold storage room. During the opening passing-through event, the control means 5 are adapted to store and/or update the sequence of the state variations of the photocells and the related time-based variation events, so as to record a final variation in the state of the photocells that is indicative of the opening passing-through event being completed, and to store the time-based event T1 in which such final variation is detected.

A variation may be considered as being a final one, when it generates a final resting state "0-0" on the photocells, i.e. when both sensors 3, 4 transmit the first signal identifying the clear-sensor and, thus, clear-opening condition for an appropriate length of time without any further variation in the sate of the sensors 3, 4.

The control means 5 are adapted to discriminate the final resting state "0-0" of the photocells that is indicative of the opening passing-through event being concluded. To this purpose, the control means 5 count—starting from a general detection of a resting state "0-0" of the photocells—a time-based discrimination interval T2 having a pre-established length. In the case that the time-based discrimination interval T2 expires and no further variation in the state of the photocells is detected during this time interval, such resting state "0-0" is assumed to be the final resting state "0-0" generated by a final variation in the state of the sensors 3, 4 that is indicative of the opening passing-through event being concluded. The control means 5 are then adapted to store the time-based detection event T1 of such final variation in the state of the sensors 3, 4.

In the case that a variation in the state of the photocells is on the contrary detected prior to the time-based discrimination interval T2 coming to an end, the counting procedure of this time-based discrimination interval T2 is interrupted, the variation is stored as one of the multiplicity of other variations, and the control means keep in a waiting, i.e. hold-on state to detect a new resting state "0-0" and start counting the time-based discrimination interval T2 again.

Exhaustive experiments carried out to this effect have shown that a time-based discrimination interval T2 having a length ranging from 0.1 to 1.0 seconds is compatible with the above-cited requirements, according to the actual size of the entry/exit opening and the arrangement of the optoelectronic sensors relative to each other, so as to effectively and reliably discriminate a condition of opening passing-through event concluded.

The control means 5 are adapted to check the initial variation in the state of the photocells and the state of the photocells immediately preceding the final variation—generally referred to as the "control state" hereinafter—for consistency with the opening being passed through either way, i.e. either in the entering direction or in the exiting direction, and to identify the direction in which said opening is passed through. For example, an initial variation in the state of the photocells "1-0", i.e. on the first photocell and the second photocell, respectively, and a control state of the photocells "0-1" are consistent with the opening of the cold storage room being passed through in the entry direction. Conversely, an initial variation in the state of the photocells "0-1", i.e. on the first photocell and the second photocell, respectively, and a control state of the photocells "1-0" are consistent with the opening of the cold storage room being passed through in the exit direction. Any situation that may arise in deviation from the two cases described above, as brought about for instance by the entry/exit opening being only partially occupied without being passed-through completely, cannot be reliably and certainly ascribed to entries or exits of items, and is therefore ruled out since it is not possible for the passing-through direction to be identified.

It should be specially mentioned that the control means 5 are adapted to continuously monitor—by means of the RFID device—the presence of transponders in proximity of the opening independently of the condition of the optoelectronic sensors 3, 4.

Upon expiry of the time-based discrimination interval T2, the control means 5 are adapted to count a time-based processing interval T3 before determining which transponders have really passed through the opening, and, therefore, have entered or exited the cold storage room. Such processing step is deferred since the tag reading area is larger than the areas covered by the optoelectronic sensors 3, 4, so it may happen that tags can be detected even after the opening has been actually passed through, i.e. after the time-based detection event T1 of the final variation in the state of the photocells and the time-based discrimination interval T2.

The control means 5 are therefore adapted to calculate the time-based passing-through event T of the transponders associated to the food products passing through the opening of the cold storage room to determine the transponders that have entered or exited the cold storage room.

To this purpose, the control means 5 are adapted to consider the time-based event relating to the initial variation T0 in the state of the photocells—as anticipated through a correction with a time-based quantity $\Delta T$—as being the initial instant of the time-based opening passing-through interval. Such initial variation T0 is anticipated owing to the fact that—as mentioned afore—the tag detection area is larger than the areas covered by the photocells, so it may happen that tags can be detected even before they actually pass through the opening, i.e. in advance of the initial variation T0 in the state of the photocells.

The control means 5 are further adapted to consider the time-based detection event of the final variation T1—as postponed through a correction with the time-based discrimination interval T2, so as to discriminate the conclusion of the opening passing-through event, and through a correction with the time-based processing interval T3, so as to allow for the fact that the tags are detected even immediately after they have actually passed through the opening—as being the actual final instant of the time-based opening passing-through interval T.

The control means 5 are then adapted to compare the time-based tag detection events with the passing-through interval T, as described hereinbefore, and to select the tags that feature time-based detection events falling within the interval T.

These tags are then associated to the passing-through event and stored as tags having entered or exited—as the case may be—the cold storage room.

Exhaustive experiments carried out in this connection have shown that a time-based quantity $\Delta T$ and a processing interval T3 having lengths ranging from 0.1 to 1.0 seconds, according to the actual size of the entry/exit opening and the arrangement of the optoelectronic sensors relative to each other, prove effective in enabling a time-based opening passing-through interval T to be calculated, which properly allows for the differences existing in the detection ranges of the sensors 3, 4 and the radio-frequency transmission means 2. Advantageously, the control means 5 are also adapted to store and process information relating to tag passing-through events so as to determine the food products available or residing inside the cold storage room at any time.

According to the present invention, the inventive apparatus is further provided with a so-called programming station 8, by means of which the possibility is given for a whole set of additional information, pertaining to or more precisely specifying the kind of food product that is going to be stored in the cold storage room, to be associated to the identification code of the tag. This kind of additional information may for instance relate to the kind or type of product, the weight, the storage period and temperature, and the like. Such programming station 8 comprises the control means 5, the RFID device, a plurality of external antennas 11 properly situated and housed on the outside of the cold storage room 1, and at least a graphic interface 12. Via the external antennas 11, the RFID device is adapted to detect the presence of a tag located in proximity of a reading position as specifically indicated on the programming station, and to signal such detection to the control means 5. In turn, the control means 5 are adapted to receive information inputs via the graphic interface 12, and to associate such information to the tag detected by the external antennas 11.

When the tag is then carried into the cold storage room 1, along with the food product which it is associated to, the control means 5 record the presence of the tag, in accordance with the afore-described procedure, by storing the tag identification code along with the additional information characterizing the food product associated thereto.

The graphic interface 12 enables the user to dialogue with the control means 5 to receive information about the products being stored in the cold storage room 1.

In a preferred embodiment of the present invention, the control means 5 are adapted to manage, i.e. control the scanning sequence of the antennas 6, 11 in a manner that, in the closed state of the cold storage room 1, only the external antennas 11 of the programming station 8 are activated, whereas the internal antennas 6 in the cold storage room 1 are inoperative; conversely, in the open state of the cold storage room 1, only the internal antennas 6 are activated so as to monitor the entry/exit opening, whereas the external antennas 11 are inoperative.

The position sensor 9 is adapted to communicate the open/closed condition of the door to the control means.

Advantageously, the open/closed information of the door 10 is used as a parameter to redundantly check tag detections for consistency. The RFID device is in fact adapted to rule out detections that are made via the internal antennas in the closed condition of the cold storage room.

Fully apparent from the above description is therefore the ability of the the present invention to effectively reach the afore-cited aims and advantages by providing a method and an apparatus that enable a plurality of tags to be monitored as they move through an entry/exit opening, so as to effectively determine the items that really enter or exit a delimited space.

The method and the apparatus according to the present invention enable tag detection events to be associated to the direction in which the same tags, and the items associated therewith, move through the opening.

The method and the apparatus according to the present invention further enable events in which the entry/exit opening is completely and actually passed through, resulting in items entering or exiting the delimited space, to be reliably dicriminated from events in which the entry/exit opening is just partially occupied by items that fail to fully pass therethrough, and in which items might in fact be detected as having entered or exited the space, which have not done it, actually.

Those skilled in the art will be capable of readily appreciating that the method and apparatus according to the present invention may be subject to a number of modifications and different embodiments without departing from the scope of the present invention.

The invention claimed is:

1. Apparatus for monitoring items passing through an entry/exit opening in a delimited space, comprising:
   radio-frequency transmission means (2) adapted to communicate with a plurality of transponders associated with said items to detect the presence of the transponders in proximity of the opening, each transponder being adapted to transmit a specific identifier code,
   at least a pair of optoelectronic sensors (3,4) arranged in series at said opening, each sensor (3,4) being adapted to transmit a first signal identifying a condition of clear sensor, in which said sensor (3,4) detects the opening as being clear, and a second signal identifying a condition of locked-on, i.e., engaged sensor, in which said sensor (3,4) detects an item passing through said opening,
   characterized in that control means (5) are provided to continuously store and/or update the time-based detection events of the transponders and the time-based variation events of the signal transmitted by the sensors (3,4), said control means (5) being adapted to compare said time-based variation events of the signal transmitted by the sensors (3,4) to determine an opening passing-through time interval (T), and to compare the time-based detection events of the transponders with said passing-through time interval (T) to determine the transponders that have passed through the opening completely.

2. Apparatus according to claim 1, characterized in that said radio-frequency transmission means (2) comprise a RFID device adapted to send out and receive electromagnetic signals via a plurality of internal antennas (6) arranged inside the delimited space.

3. Apparatus according to claim 2, characterized in that support members (7) are provided to accommodate the internal antennas (6) of the RFID device for them to be able to detect the transponders passing through the entry/exit opening of the delimited space.

4. Apparatus according to claim 1, characterized in that said pair of optoelectronic sensors (3,4) comprise a first photocell and a second photocell.

5. Apparatus according to claim 1, characterized in that said control means (5) are adapted to store to identifier code of the transponders that pass through the entry/exit opening to determine the items being present inside the delimited space.

6. Apparatus according to claim 1, characterized in that it comprises a programming station (8) adapted to associate to each transponder identifier code additional information concerning the item which the transponder is adapted to be applied to.

7. Apparatus according to claim 6, characterized in that said programming station (8) comprises the control means (5), the RFID device, a plurality of external antennas (11) housed on the outside of the delimited space, and at least a graphic interface (12).

8. Apparatus according to claim 7, characterized in that, via the external antennas (11), the RFID device is adapted to detect the presence of a transponder positioned in proximity of the programming station (8), and to signal detection to the control means (5), said control means (5) being in turn adapted to acquire information inputs via the graphic interface (12), and to associate such information to the identifier code of the transponder detected by the external antennas (11).

9. Apparatus according to claim 8, characterized in that said graphic interface (12) is adapted to dialogue with said control means (5) to enable information associate to the identifier codes of transponders contained inside the delimited space to be displayed.

10. Apparatus according to claim 1, characterized in that a position sensor (9) connected to said control means is provided to monitor the state of a door (10) adapted to close said delimited space.

11. Apparatus according to claim 1, characterized in that said control means (5) are adapted to manage the scanning sequence of the antennas (6,11) in a manner that, in the closed state of the cold storage room (1), only the external antennas (11) of the programming station (8) are activated, whereas the internal antennas (6) in the cold storate room (1) are inoperative, and conversely, in the open state of the cold storage room (1), only the internal antennas (6) are activated so as to monitor the entry/exit opening, whereas the external antennas (11) are inoperative.

12. Cold storage room comprising the apparatus according to claim 1.

13. Method for monitoring items passing through an entry/exit opening in a delimited space, comprising:
providing radio-frequency transmission means (2) adapted to communicate with a plurality of transponders associated with said items to detect the presence of the transponders in proximity of the opening, each transponder being adapted to transmit a specific identifier code,
providing at least a pair of optoelectronic sensors (3,4) arranged in series at said opening and adapted to transmit a first signal identifying a condition of clear sensor, in which said sensor (3,4) detects the opening as being clear, and a second signal identifying a condition of locked-on, i.e. engaged sensor, in which said sensor (3,4) detects an item passing through said opening,
characterized in that it further comprises the steps of:
continuously storing and/or updating the time-based detection events of the transponders, the variations in the signal being transmitted by the sensors (3,4) and the time-based events of said variations,
comparing the variations in the signals transmitted by the sensors (3,4) to check such variations for consistency with items really passing through the entry/exit opening, and to determine a direction in which said items pass through said opening,
comparing the time-based variation events of the signal transmitted by the sensors (3,4) to determine a passing-through time interval (T) in which the items have completely moved through said opening,
comparing the time-based detection events of the transponders with said passing-through time interval (T),
determining the transponders whose time-based detection events fall within said passing-through time interval (T) to determine the items that have passed through the opening completely.

14. Method according to claim 13, characterized in that it comprises recording and storing, from a condition of clear opening, an initial variation in the signal from the sensors (3,4) and the time-based event (T0) of such initial variation.

15. Method according to claim 14, characterized in that it comprises storing and/or updating the sequence of the variations in the signals from the sensors (3,4) and the related time-based variation events, starting from said time-based event (T0) of said initial variation, so as to record a final variation in the signals of the sensors (3,4) that is indicative of the opening passing-through event being completed, in which both said sensors (3,4) transmit said first signal for at least a discrimination time interval (T2) having a pre-established length, and store a time-based event (T1) of said final variation.

16. Method according to claim 15, characterized in that it comprises the steps of
recording a variation in the signal from the sensors (3,4), in which both sensors (3,4) transmit said first signal,
counting, staffing from said variation, a discrimination time interval (T2) having a pre-established length,
if said discrimination time interval (T2) expires and no farther variation is detected in the signals from the sensors (3,4), storing said variation as the final variation in the signals from the sensors (3,4) indicating that the opening pass-through event is concluded,
storing the time-based event (T1) of said final variation upon expiry of said discrimination time interval (T2).

17. Method according to claim 16, characterized in that it comprises the steps of interrupting counting said discrimination time interval (T2) if a variation in the signals from the sensors (3,4) is detected prior to said discrimination time interval (T2) expiring, and storing said variation.

18. Method according to claim 13, characterized in that it comprises the steps of
checking the signals transmitted by the sensors (3,4) in the circumstance of said initial variation and the signals transmitted by the sensors (3,4) at a moment immediately preceding said final variation for consistency with the opening being completely passed through either way, i.e. either in the entering direction or in the exiting direction,
identifying, based on said signals, the direction in which the detected items move through the opening.

19. Method according to claim 13, characterized in that it comprises the step of counting, upon expiry of said discrimination time interval (T2), a processing time interval (T3) to allow for the fact that the detection range of the radio-frequency transmission means is greater than the detection range of the optoelectronic sensors (3,4).

20. Method according to claim 13, characterized in that it comprises the steps of
considering the time-based event relating to the initial variation (T0)—as anticipated through a correction with a time-based quantity (AT) to allow for the fact that the detection range of the radio-frequency transmission means is greater than the detection range of the optoelectronic sensors (3,4)—as being the initial instant of the opening passing-through time interval,
considering the time-based detection event of the final variation (T1)—as delayed through a correction with the discrimination time interval (T2) and through a correction with the processing time interval (T3) to allow for the fact that the detection range of the radio-frequency transmission means is greater than the detection range of the optoelectronic sensors (3,4)—as being the actual final instant of said opening passing-through time interval (T).

* * * * *